(12) United States Patent
Fini

(10) Patent No.: US 7,920,767 B2
(45) Date of Patent: Apr. 5, 2011

(54) SUPPRESSION OF HIGHER-ORDER MODES BY RESONANT COUPLING IN BEND-COMPENSATED OPTICAL FIBERS

(75) Inventor: John Michael Fini, Jersey City, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/215,313

(22) Filed: Jun. 26, 2008

(65) Prior Publication Data
US 2009/0034059 A1 Feb. 5, 2009

Related U.S. Application Data

(63) Continuation-in-part of application No. 11/319,121, filed on Dec. 27, 2005, now Pat. No. 7,764,854.

(60) Provisional application No. 60/950,618, filed on Jul. 19, 2007.

(51) Int. Cl.
*G02B 6/02* (2006.01)
(52) U.S. Cl. .................. 385/123; 385/126
(58) Field of Classification Search .............. 385/123
See application file for complete search history.

(56) References Cited

U.S. PATENT DOCUMENTS

| | | | |
|---|---|---|---|
| 6,535,678 B1 * | 3/2003 | Yamauchi et al. | 385/123 |
| 7,356,233 B2 | 4/2008 | Fini | 385/126 |
| 2006/0257071 A1 | 11/2006 | Bise et al. | 385/29 |
| 2007/0147751 A1 | 6/2007 | Fini | 385/123 |

OTHER PUBLICATIONS

C-H. Liu, et al., "Chirally Couple Core Fibers at 1550-nm and 1064-nm . . . ," *CLEO*, Baltimore, MD, Paper CTuBB3 (2 pages) (May 6-11, 2007).
L. Lavoute, et al., "Design of microstructured single-mode fiber . . . ," *Optics Express*, vol. 14, No. 7, pp. 2994-2999 (Apr. 2006).
J. M. Fini, "Design of solid and microstructure fibers for suppression of higher-order modes," *Optics Express*, vol. 13, No. 9, pp. 3477-3490 (May 2005).
J. M. Fini, "Pre-compensated resonant higher-order mode suppression . . . ," *CLEO*, San Jose, CA, Paper CMB6 (2 pages) (May 4-9, 2008).
J. M. Fini, "Intuitive modeling of bend distortion in large-mode-area fibers," *Optics Letters*, No. 12, pp. 1632-1634 (Jun. 2007).

* cited by examiner

*Primary Examiner* — Uyen-Chau N Le
*Assistant Examiner* — Kajli Prince
(74) *Attorney, Agent, or Firm* — Michael J. Urbano; Michael A. Morra; Ann H. LaFeir

(57) ABSTRACT

The effect of bending is anticipated in an optical fiber design, so that resonant coupling remains an effective strategy for suppressing HOMs. The index profile of the fiber and its bend radius are configured so that there is selective resonant coupling of at least one HOM, but not the fundamental mode, in the bent segment of the fiber. In an illustrative embodiment, the core and cladding regions are configured to support the propagation of signal light in a fundamental transverse mode and at least one higher-order transverse mode in the core region. The cladding region includes an outer cladding region and an annular trench region. The trench region includes at least one axially extending, raised-index pedestal (waveguide) region having a refractive index higher than that of the outer cladding region.

16 Claims, 6 Drawing Sheets

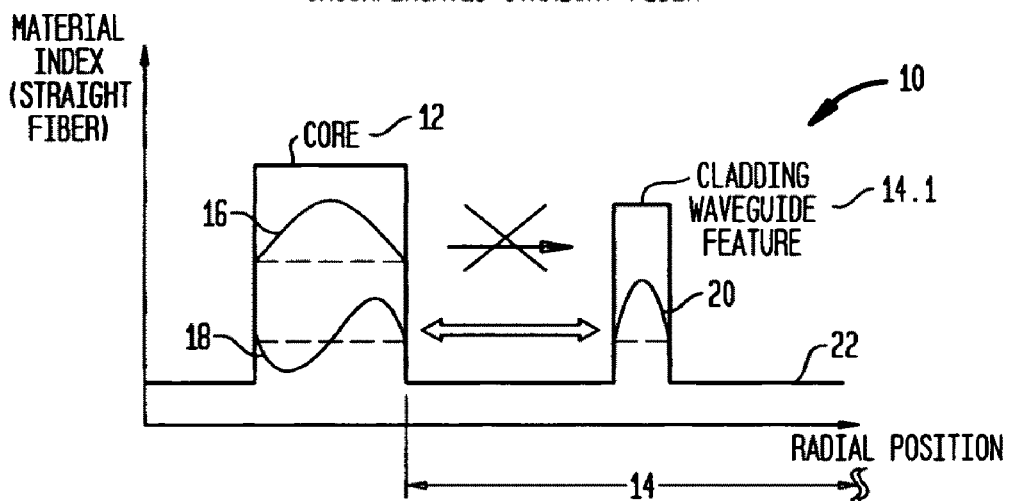
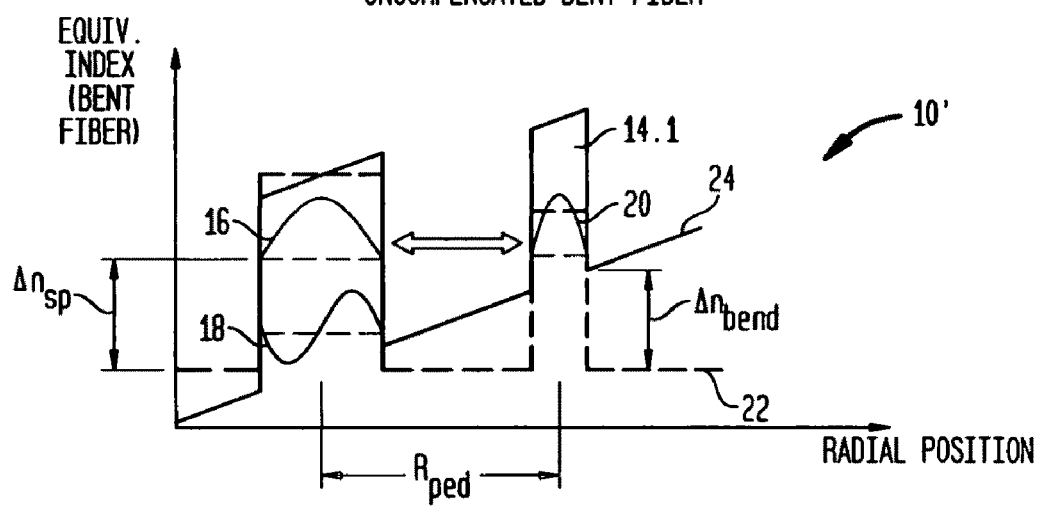

PRE-COMPENSATED STRAIGHT FIBER

PRE-COMPENSATED BENT FIBER

SUPPRESSION OF HIGHER-ORDER MODES BY RESONANT COUPLING IN BEND-COMPENSATED OPTICAL FIBERS

CROSS-REFERENCE TO RELATED APPLICATIONS

This application claims priority from provisional application Ser. No. 60/950,618, which was filed on Jul. 19, 2007 and is entitled "Large-Mode-Area Fiber Design with Suppression of Higher-Order Modes."

This application is also a continuation-in-part of application Ser. No. 11/319,121 (Fini 2), which was filed on Dec. 27, 2005 now U.S. Pat. No. 7,764,854, and is entitled "Optical Fiber with Specialized Index Profile to Compensate for Bend-Induced Distortion."

GOVERNMENT CONTRACT

This invention was made with Government support under the Advanced Technology Program of the National Institute of Standards and Technology, Award No. 70NANB4H3035. The Government has certain rights in this invention.

BACKGROUND OF THE INVENTION

1. Field of the Invention

This invention relates to mode suppression in optical fibers and, more particularly, to the suppression of higher-order modes by resonant coupling in bend-compensated fibers, including, for example, large-mode-area (LMA) fibers.

2. Discussion of the Related Art

Resonant coupling, including index-matching, is a technique for suppressing higher order modes in an optical fiber. [See, for example, J. M. Fini, "Design of solid and microstructure fibers for suppression of higher-order modes," *Optics Express*, Vol. 13, p. 3477 (2005), which is incorporated herein by reference.] A straight fiber 10 that relies on resonant coupling, as shown in the material refractive index profile of FIG. 1, includes a core region 12 and a cladding region 14 configured so that radiation propagates in the core region in a fundamental transverse mode 16 and, disadvantageously, in at least one higher-order transverse mode 18. To effect mode suppression the fiber also includes a raised-index cladding feature 14.1 that extends along the length of the fiber. The feature may be a ring (or annulus) encompassing the core or an inclusion, such as a rod (round or otherwise), in the cladding region.

In FIG. 1 the two transverse modes guided in the core region 12 are depicted as a Gaussian-like fundamental mode 16 and the higher-order $LP_{11}$ mode 18, whereas the transverse mode guided in the feature 14.1 is depicted as a fundamental mode 20. The vertical placement of the modes in this schematic is indicative of the effective indices of the modes. If the mode 20 supported by the feature 14.1 is essentially index-matched with a mode in the core, such as the $LP_{11}$ higher-order mode (HOM) 18, light will couple from that HOM mode 18 of the core region to the mode 20 of the feature and ultimately to the outer cladding. In preferred designs, the fundamental mode 16 of the core region will not be index-matched to any mode, including specifically mode 20, of the feature. Therefore, the fundamental mode 16 will remain well confined (and propagate with low loss), without coupling to the mode of the feature. In this way, the HOMs are effectively pulled out of the core, where they suffer losses and reduced gain; that is, they are suppressed.

However, in this simple analysis the impact of bending the fiber on index-matched coupling has been neglected. In FIG. 2, the effect of bending the fiber is treated as a tilting of the material index profile 22, which distorts the effective indices of the modes and results in different coupling from the unbent (straight) fiber case; that is, bend-induced distortion produces an equivalent index profile 24 quite different from the designed material index profile 22. Consequently, the bent fiber 10' may frustrate the intended result. Resonant coupling in the bent fiber 10' may cause the fundamental mode 16 to be undesirably coupled to the cladding feature mode 20 (with attendant high losses) and may even prevent HOM 18 from being to coupled to mode 20 (with attendant failure of suppression).

Thus, a need remains in the art for a resonant coupling technique that is effective in suppressing HOMs, while maintaining propagation of the fundamental mode, when the fiber is bent.

This need is particularly acute in LMA fibers, which are commonly used in applications that incorporate optical fiber amplifiers and lasers. (In LMA fibers the effective core area illustratively ranges from about 100 $\mu m^2$ to about 1500 $\mu m^2$, but could range even higher.) In these applications, the relatively large core area of a LMA fiber accommodates higher power but also permits more HOMs to propagate. Strategies exist for suppressing HOMs in straight fibers, but in typical amplifier or laser packages the LMA fiber is coiled so that it fits within the package space. Under such circumstances, the radius of the coiled fiber (or at least a range of radii) is known a priori, a fact which is exploited in a preferred embodiment of my invention.

BRIEF SUMMARY OF THE INVENTION

In accordance with one aspect of my invention, the effect of bending is anticipated in an optical fiber design, so that resonant coupling remains an effective strategy for suppressing HOMs. The index profile of the fiber and its bend radius are configured so that there is selective resonant coupling of at least one HOM, but not the fundamental mode, in the bent fiber (or in the bent segment of an otherwise straight fiber).

In an illustrative embodiment of my invention, the bend radius (or a predetermined range of bend radii) of an optical fiber is known a priori. The fiber comprises a core region having a longitudinal axis, and a cladding region surrounding the core region. The core and cladding regions are configured to support (guide) the propagation of signal light in a fundamental transverse mode and in at least one higher-order transverse mode. These modes propagate in the core region in essentially the direction of the longitudinal axis. The cladding region includes an outer cladding region and an annular trench disposed between the core region and the outer cladding region. The trench region also includes at least one raised-index pedestal (waveguide) region having a refractive index higher than that of the outer cladding region. Within at least a bent segment of the fiber, the at least one pedestal region is configured (i) to support the propagation of at least one transverse mode and (ii) to resonantly couple at least one of the higher-order transverse modes (i.e., a HOM) of the core region to at least one transverse mode (e.g., the fundamental mode) of the pedestal region when the fiber segment is bent to a radius within the predetermined range of radii.

In effect, the pedestal regions are configured so that the fiber is pre-compensated for the bend effect described above; that is, an uncompensated bent fiber segment suffers high fundamental mode loss due to resonant coupling, whereas the pre-compensated bent fiber segment selectively couples any unwanted HOM from the core region into the pedestal region.

In a preferred embodiment of my invention, the optical fiber is a LMA fiber incorporated in an optical fiber amplifier or laser package. As such, the radius of the bent (i.e., coiled) fiber is known a priori and that fact is exploited to pre-compensate the fiber so that it remains effective to suppress HOMs even in the coiled state.

BRIEF DESCRIPTION OF THE SEVERAL VIEWS OF THE DRAWING

My invention, together with its various features and advantages, can be readily understood from the following more detailed description taken in conjunction with the accompanying drawing, in which:

FIG. 1 is a schematic, material refractive index profile used to describe resonant coupling of a HOM in prior art straight optical fibers;

FIG. 2 is a schematic, equivalent refractive index profile used to describe resonant coupling of a fundamental mode in prior art bent optical fibers;

Figure 3:
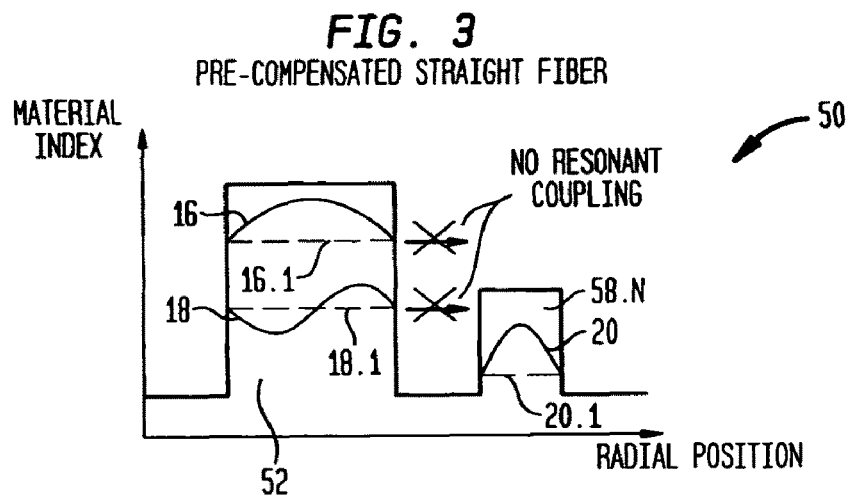
FIG. 3 is a schematic, material refractive index profile used to describe resonant coupling (or lack thereof) in straight optical fibers, in accordance with one embodiment of my invention.
Figure 4:
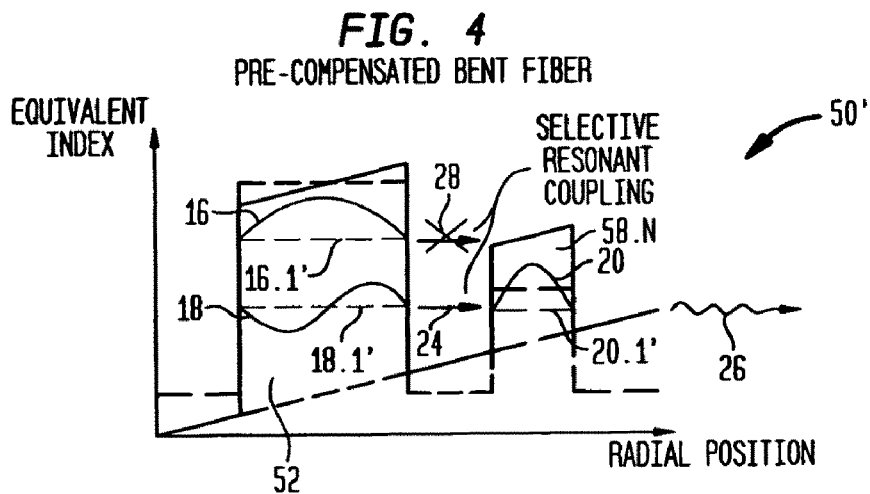
FIG. 4 is a schematic, equivalent refractive index profile used to describe resonant coupling of a HOM in bent optical fibers, in accordance with one embodiment of my invention.

Various ones of the foregoing figures are shown schematically in that they are not drawn to scale and/or, in the interests of simplicity and clarity of illustration, do not include all of the details of an actual optical fiber or product depicted. In particular, the index profiles of FIGS. 1-4 and 6 are averages of the actual variations of index that would be observable in an optical fiber.

Although the use of the term radius in the foregoing (and following) discussion implies that the cross-sections of the various regions (e.g., core, pedestal, trench, cladding) are circular and/or annular, in practice these regions may be non-circular; for example, they may be elliptical, polygonal, irregular or other more complex shapes. Nevertheless, as is common in the art, I sometimes use the term radius for simplicity and clarity.

Hereinafter, the term models) shall mean transverse mode(s), and the terms index and indices shall mean refractive index and refractive indices.

DETAILED DESCRIPTION OF THE INVENTION

Optical Fiber Design—General Considerations

The first consideration in pre-compensating fibers in accordance with my invention is to understand when the bend in a fiber, or fiber segment, is sufficiently large to have a significant impact on fiber performance. Thus, returning to FIG. 2, when fiber 10' is bent to a radius $R_{bend}$, the index profile at the center of feature 14.1 increases by an amount $\Delta n_{bend}$, but the effective index difference (or spacing) $\Delta n_{sp}$ of modes 16, 18 remains relatively constant because both modes are centered in the core region. The issue to be addressed is this: When is $R_{bend}$ so small that selective resonant coupling is disrupted? More specifically, when is $R_{bend}$ so small that resonant coupling between (i) unwanted HOM 18 and feature mode 20 is disrupted and (ii) fundamental mode 16 and feature mode 20 (or any other mode of feature 14.1) is undesirably introduced? My analysis indicates that $R_{bend}$ is too small when $\Delta n_{bend}$ is comparable to $\Delta n_{sp}$, as shown in Equation (1):

$$\Delta n_{bend} = (n_{ped} R_{ped} / R_{bend}) \sim \Delta n_{sp} \qquad (1)$$

Clearly, if $\Delta n_{bend} = \Delta n_{sp}$ performance will seriously suffer in a bent fiber, but even if these two parameters are within an order of magnitude, performance may still be inadequate. However, an adequate solution to this problem does not reside in simply limiting the bend radius, which quickly becomes impractical for larger core fibers (e.g., LMA fibers). For example, my simulations show that fibers of this type have unacceptable fundamental mode losses, and essentially no selectivity, at bend radius as large as 50 cm! However, fibers pre-compensated in accordance with the principles of my invention described below, even LMA fibers, exhibit desired selectivity even at bend radii of approximately 15 cm.

Therefore, I use the term straight fiber, or nearly straight fiber to describe fibers that may be truly straight or may be bent at sufficiently large radius that bending effects affect resonant coupling insignificantly. From the condition $\Delta n_{bend} \ll \Delta n_{sp}$, one can derive the following scaling rule: the bend radius $R_{bend}$ should be greater than approximately $kR_{core}^3/\lambda^2$, where k is a constant equal to about 110, and λ is the wavelength of the signal light propagating in the fiber. The derivation of this scaling rule follows a similar derivation described by me in *Opt. Lett.*, Vol. 32, No. 12, pp. 1632-1634 (2007), which is incorporated herein by reference (although the constant k obtained in that reference may differ from the one given here). Consider two illustrations: (i) a LMA fiber for use in amplifier/laser applications in which $R_{core} \approx 17$ μm, λ≈1.06 μm, which means that $R_{bend}$ should be greater than about 48 cm; and (ii) a single mode fiber for telecommunication applications in which $R_{core}$≈4.5 μm, λ≈1.55 μm, which means that $R_{bend}$ should be greater than about 4.2 mm.

Figure 5:
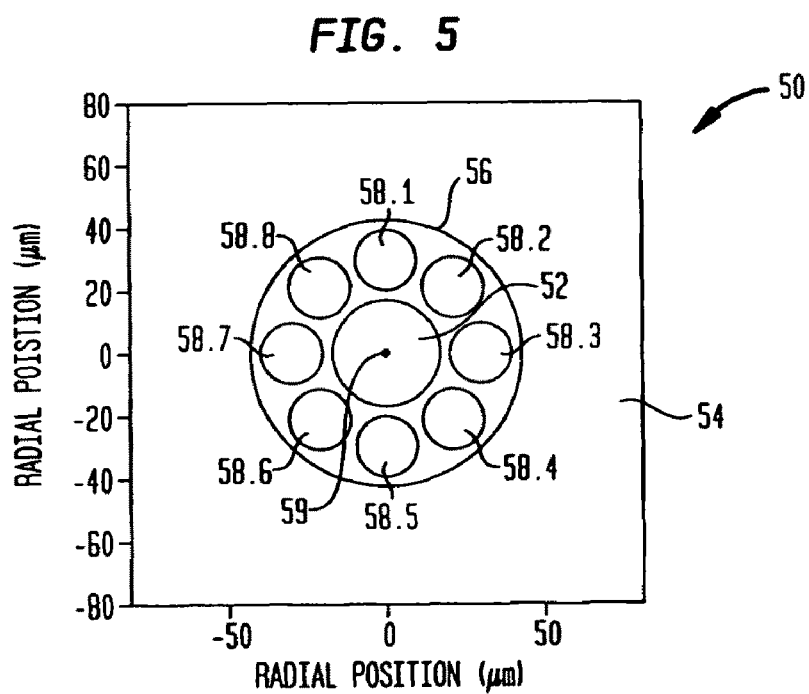
FIG. 5 is a schematic, cross-sectional view of a LMA optical fiber used in simulation studies in accordance with one more embodiment of my invention in which a multiplicity of raised-index pedestals (waveguides) are disposed within an annular trench region surrounding the core region.
Figure 6A:
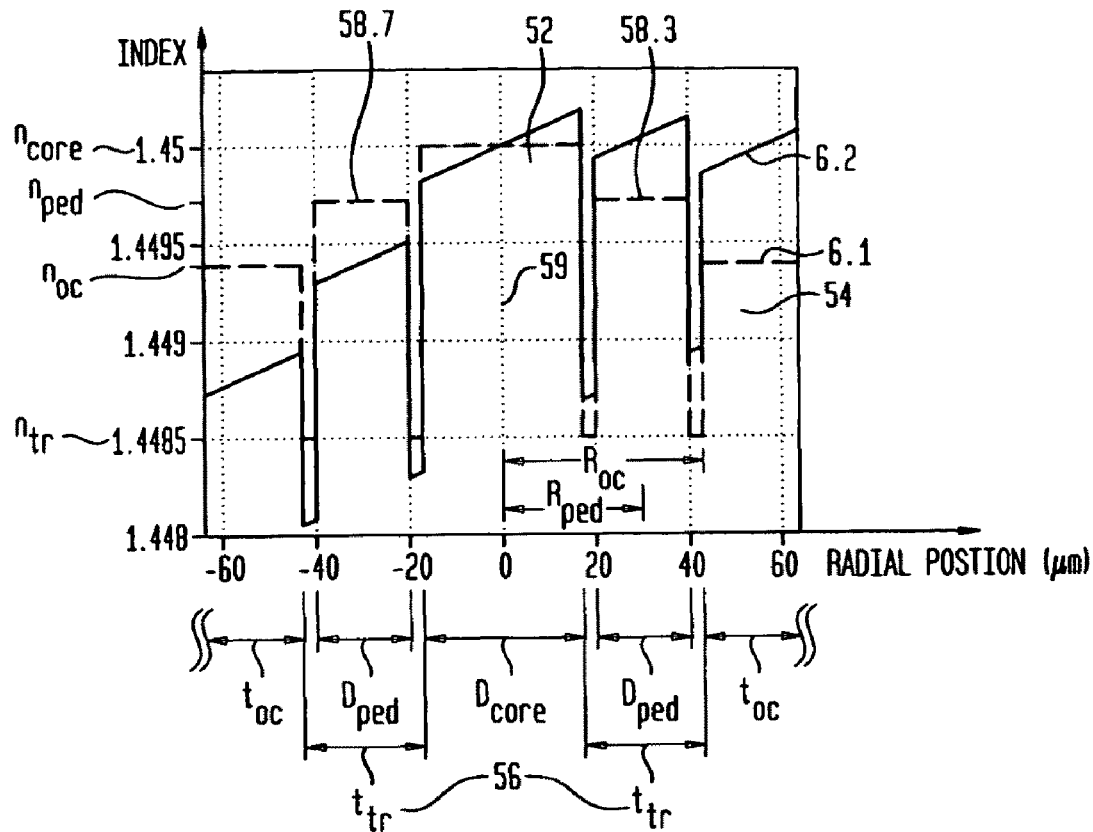
FIG. 6A is a calculated refractive index profile of a cross-section of the fiber of FIG. 5 in a straight (dashed curve 6.1) condition and in a bent (solid curve 6.2) condition. The cross-section is taken horizontally through the centers of circular pedestals 58.3 and 58.7 of FIG. 5.
Figure 6B:
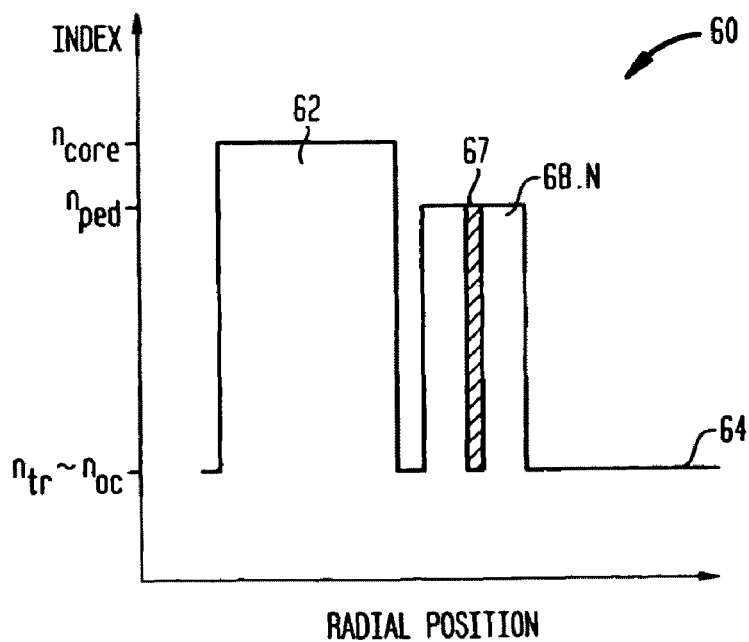
FIG. 6B is a schematic refractive index profile of a partial cross-section of an optical fiber in accordance with an alternative embodiment of my invention in which a loss mechanism is introduced into the pedestal regions to suppress unwanted HOMs.

With reference now to FIGS. 5 and 6A, an optical fiber 50 in accordance with one aspect of my invention suppresses at least one (unwanted) HOM of the core region of the bent fiber (or fiber segment) and, as such, is suitable for a variety of bent-fiber applications including, for example, coiled fibers in optical amplifier and laser packages. Fiber 50 includes a core region 52 surrounded by a cladding region 54, with the core and cladding regions being configured to support and guide the propagation of signal light (radiation) axially along a longitudinal axis 59 located at essentially the center of the core region 52. (For simplicity, the outer boundary of the outer cladding region 54 is not shown.)

Although signal light may actually crisscross axis 59 as it propagates along fiber 50, it is well understood in the art that the general direction of propagation is fairly stated as being along axis 59.

Fiber of this type is typically made of glass (e.g., silica) in which the refractive indices of the core region and of the cladding region are controlled by the amount and type of dopants (e.g., P, Al, Ge, F) incorporated therein during the fabrication of the fiber, as is well known in the art. These refractive indices, as well as the thicknesses/diameters of core/cladding regions, determine important operating parameters of the fiber, as discussed below.

In accordance with one embodiment of my invention, the core region 52 (diameter $D_{core}$) and the outer cladding region 54 (radial thickness $t_{oc}$, but the outer boundary is not shown) are separated by an annular trench region 56 (radial thickness $t_{tr}$). At least one axially-extending waveguide [e.g., pedestal region 58.N (N=1, 2, 3 . . . )] is disposed within the trench region 56. In a preferred embodiment, there is a multiplicity of pedestal regions 58.N (i.e., N>1). In a further preferred embodiment, the centers of these pedestal regions are circumferentially disposed at essentially the same radius ($R_{ped}$) and at essentially equally spaced azimuthal positions within the trench region 56. (However, locating all of the pedestal regions at the same radius and/or at equally spaced azimuthal positions is not essential.)

For purposes of the following exposition only, eight circular pedestal regions 58.N (N=1-8) are depicted in FIG. 5 as being equally spaced azimuthally [at 45° intervals] and all at the same radius, $R_{ped}$=0.5($D_{core}$+$t_{tr}$) within the trench region 56. In a preferred embodiment, the pedestal regions 58.N are also radially centered within the trench region 56 As shown in FIG. 6A, the material refractive indices of the core ($n_{core}$), trench ($n_{tr}$), pedestal ($n_{ped}$) and outer cladding ($n_{oc}$) regions illustratively satisfy the following conditions:

$$n_{core} > n_{ped} > n_{oc}, \quad (2)$$

$$n_{tr} < n_{oc}, \quad (3)$$

However, fibers in accordance with my invention need not strictly conform to Equation (2) or Equation (3). Thus, for example, $n_{tr}$ need not be less than $n_{oc}$, although this type of design allows pedestal mode 20 to radiate into the outer cladding region 54. As shown in fiber 60 of FIG. 6B, $n_{tr}$~$n_{oc}$, but in designs of this type pedestal mode 20 may be suppressed by radiation (tunneling) into the outer cladding region 54 or by a loss mechanism 67 included in pedestal regions 68.N. Such loss mechanisms include, for example, well-known absorption or scattering centers. Alternatively, in a gain-producing fiber the pedestal regions can be configured so that pedestal mode 20 has lower gain overlap than the fundamental mode 16.

The material refractive index ($n_{mat}$) of the straight fiber is related to the equivalent refractive index ($n_{eq}$) of the bent fiber according to equation (4):

$$n_{eq}=n_{mat}(1+x/R_{corr}), \quad (4)$$

where x is the position in the fiber cross section toward the outside of the bend, $R_{corr}$ is the corrected bend radius obtained by multiplying the physical bend radius $R_{bend}$ by a constant correction factor; that is, $R_{corr}$=$R_{bend}$ when the simulation model is not compensated for stress and $R_{corr}$=$R_{bend}$/0.8 if the stress correction factor (1/0.8) is included. Equation (4) was obtained by well-known conformal mapping of the bend geometry.

In a preferred embodiment of my invention, the optical fiber of FIG. 5 is an LMA fiber, which illustratively has an effective mode-field area ($A_{eff}$) of 100-1500 μm² approximately, as mentioned previously. In a LMA fiber with a core diameter greater than about 40 μm the modes become quite sensitive to mode coupling induced by bending and random perturbations. In fact, bend-induced distortion becomes pronounced at about 40 μm core diameter and severe at or above 60 μm diameters. The principal application of such LMA fibers is in optical amplifiers and lasers, where the LMA fiber may be either a gain-producing fiber or a LMA pigtail coupled thereto.

Optical Fiber Design—HOM Considerations

In order to suppress HOMs, the core region 52 and the pedestal regions 58.N are configured so that at least one of the modes of the pedestal regions 58.N resonantly couples with at least one (unwanted) HOM of the core region 52 in a bent segment of the fiber. As shown in the simplified equivalent index profile of a bent segment of fiber 50' (FIG. 4), preferably HOM 18 (illustratively depicted as a $1^{st}$-order mode) of the core region 52 is resonant with a mode 20 of the pedestal region 58.N, whereas the fundamental mode 16 of the core region is not resonant with any mode of the pedestal region. The mode 20 is typically one of the ring modes of pedestal region 58.N with the highest or nearly the highest effective index, and the mode 20 is not forbidden by well-known symmetry principles from coupling to the HOM of the core region. In contrast, when the fiber is straight (or nearly so), as shown in the material index profile of FIG. 3, no mode of the core region 52 is resonant with mode 20 of pedestal region 58.N. This design is acceptable because the fiber 50/50' is intended for use in bent-fiber applications, such as coiled fiber contained within the package of optical amplifiers and lasers. Under such circumstances most of the fiber is coiled and only a relatively short segment may be straight. However, my invention is not limited to such applications. In general, my invention is applicable to any fiber in which at least a segment thereof is bent sufficiently that bend effects would significantly disrupt the selectivity of resonant coupling.

Thus, in one embodiment of my invention, a fiber has both a straight segment and a bent segment. Within the bent segment of the fiber, the at least one pedestal region 58.N is configured (i) to support the propagation of at least one transverse mode; and (ii) to resonantly couple at least one selected HOM of the HOMs 18 of the core region 12 to at least one transverse mode (e.g., the fundamental mode 20) of the pedestal region 58.N when the fiber segment is bent to a radius within a predetermined range of radii; but (iii) not to resonantly couple the fundamental mode 16 of the core region to any transverse mode of the pedestal region 14.1. In addition, within the straight segment, the pedestal region 58.N is configured (i) to support the propagation of at least one transverse mode and (ii) not to resonantly couple the selected HOM of the core region 12 to any transverse mode of the pedestal region 58.N.

Note, however, even with a coiled fiber the precise direction of bending may not always be known a priori. This type of orientation sensitivity, however, is mitigated by having a multiplicity of pedestals regions 58.N positioned circumferentially around the trench region 56 (FIG. 5). With a design of this type, regardless of the direction of bending, the fiber can be made to have at least one pedestal region into which the HOM will be coupled and ultimately suppressed. Thus, for example, when the fiber 50 of FIG. 5 is bent to the left, an HOM of the core region is coupled into pedestal region 58.3, whereas when the fiber is bent to the right, the HOM is coupled into pedestal region 58.7. Likewise, when the fiber is bent up, the HOM is coupled into pedestal region 58.5, whereas when the fiber is bent down, the HOM is coupled into pedestal region 58.1. Similar comments apply to bending the fiber at intermediate azimuthal angles (e.g., at 45°, 135°, 225° and 315°) in which cases an HOM would be coupled into the corresponding intermediate pedestal regions 58.2, 58.4, 58.6 and 58.8, respectively. Of course, in some cases an HOM may be concurrently coupled into more than one pedestal region (e.g., see, FIG. 11, infra). In a fiber insensitive to bend orientation, HOM suppression will be maintained even in the typical case where the fiber is coiled with an uncontrolled or varying orientation with respect to the bend direction.

By the terms resonant or resonantly coupled I mean that the effective refractive index ($n_{eff}$) of a mode in the core region is essentially equal to that of a mode in the pedestal region in a bent segment of the fiber. Bending fiber 50 causes $n_{eff}$ 16.1 and 18.1 to shift to the levels indicated by 16.1' and 18.1', respectively, as shown by the equivalent index profile of the bent fiber 50' in FIG. 4. (The amount of actual shift of levels 16.1' and 18.1' is relatively small and, therefore, is not shown in the schematic index profile of FIG. 4.) More specifically, in accordance with my invention, $n_{eff}$ 18.1' of the 1$^{st}$-order mode 18 of the core region 52 is essentially equal to the $n_{eff}$ 20.1' of the fundamental mode 20 of the pedestal region 58.N, which allows energy in HOM 18 to transfer or couple (arrow 24) from the core region into mode 20 of the pedestal region and from there to radiate (tunnel) into the outer cladding region 54. (Arrow 26 indicates such radiation via leaky cladding modes, which are usually present. As previously discussed, this energy may alternatively be lost by incorporating well-known absorption, scattering, etc. centers into the pedestal and/or outer cladding regions.) After a suitable propagation distance along the fiber, this process of resonant transfer and radiation effectively suppresses HOM 18 in the core region. In contrast, $n_{eff}$ 16.1' of the fundamental mode 16 of the core region does not correspond to the $n_{eff}$ of any mode in the pedestal region. Consequently, the fundamental mode 16 propagates effectively in the core region, and no resonant transfer of its energy (negated arrow 28) into the pedestal region takes place. I refer to this process as selective coupling.

The condition that a core region mode and a pedestal region mode of the bent fiber segment have essentially equal refractive indices means, for example, that the core region HOM index 18.1' and the pedestal region mode index 20.1' are not so different that coupling of light between these modes is significantly frustrated. In a preferred embodiment of the invention, the difference between indices 18.1' and 20.1' is much less than the difference between the core fundamental mode index 16.1' and the pedestal mode index 20.1'.

Design Principles

In order to pre-compensate the fiber so that resonant coupling is efficacious in the bent fiber segment, one can start with a straight-fiber design optimized for resonant coupling and then adjust the index of the pedestal and outer cladding regions of the straight fiber to pre-compensate for the bend perturbation. For a particular feature with index $n_{ped}$ at a radial position $R_{ped}$ and azimuthal position θ, the pre-compensation is given by Equation (5)

$$\Delta n_{comp} = -n_{ped}(R_{ped}/R_{corr})\cos(\theta - \theta_{bend}), \quad (5)$$

where $\theta_{bend}$ is the azimuthal direction toward the outside of the bend. To adjust a multiplicity of pedestal regions with unknown bend orientation, each is reduced by approximately an amount $\Delta n_{comp}$ given by equation (6):

$$\Delta n_{comp} = -n_{ped}(R_{ped}/R_{corr}) \quad (6)$$

where $R_{ped}$ is the radial position of the center of the pedestal regions 58.N relative to the core region 52; i.e., relative to axis 59. Equations (5)-(6) are based on a simplified calculation in which (i) the bend-induced effective index shift of the core modes is small relative to that of the pedestal modes. Equation (6) further assumes that (ii) the pedestal regions (i.e., the cladding waveguides) responsible for HOM coupling are those on the outside of the bend [$\cos(\theta - \theta_{bend}) \sim 1$]. More generally, however, pre-compensation may also include all bend-induced effects using more detailed models, empirical data, etc. This type of general calculation would be used, for example, in fiber designs that are not rotationally symmetric such as fibers with only one pedestal region, or in which the pedestal regions 58.N are not equally spaced (radially or azimuthally) within trench region 56.

Proper coupling between the core region mode to be suppressed and the resonant pedestal region mode should also take into account the need to reduce coupling of the latter pedestal mode back into the former core mode. Reverse coupling is suppressed with the proper balance of resonant coupling and pedestal-mode loss (or reduced gain), as described in the following paragraphs.

The fiber 50' should also be configured to allow effective suppression of unwanted core modes through the pedestal modes. This condition requires index matching and appropriate levels of pedestal loss (or reduced gain) and coupling strength (to the core). To match the effective indices of the pedestal mode and the unwanted mode in the bent-fiber segment, the pedestal mode effective index is controlled most directly through the pedestal region index $n_{ped}$ and diameter $D_{ped}$. The radial position $R_{ped}$ of the pedestal is used to adjust the coupling strength between core and pedestal. The trench thickness $t_{tr}$ and outer cladding index $n_{oc}$ are used to adjust tunneling losses of the pedestal modes (although other loss mechanisms could alternatively be used), and similarly control fundamental core-mode tunneling losses. Equivalently, one can think of controlling the balance of pedestal loss and pedestal coupling (to the core) by adjusting the ratio of spacings between (1) pedestal and core ($R_{ped} - 0.5 D_{core}$) and (2) pedestal and outer cladding ($R_{oc} - R_{ped}$). In one embodiment of my invention, this ratio is around one.

In addition, the coupling between the core region and the pedestal region should not be so large that the desired (fundamental) core mode is disrupted. On the other hand, the coupling between the core region and the pedestal region should not be too small that unwanted core modes will not couple sufficiently to pedestal modes to be suppressed. Next, the loss rate of the pedestal modes should not be so large that coupling between the core and pedestal region is frustrated (i.e., insufficient). Finally, the loss rate of the pedestal mode should not be so small that unwanted core modes coupled thereto will experience too little loss to be effectively suppressed. In this respect, reduced gain of the pedestal modes can essentially play the role of loss. In addition, the outer cladding index should be chosen to maximize HOM suppression while minimizing fundamental mode loss, both in the bent-fiber segment. To this end, the outer cladding index can also be pre-compensated to maintain the relative index differences between the modes and the outer cladding. That is, if an optimized straight-fiber design has outer cladding index $[n_{oc}]^{straight}$ favorable for HOM suppression and low fundamental mode bend loss, a desirable bent-fiber design will have an outer cladding with index adjusted according to Equation (5); that is, $$[n_{oc}]^{bent} = [n_{oc}]^{straight} - \Delta n_{comp} \quad (7)$$

and with $\cos(\theta - \theta_{bend}) = 1$, $$[n_{oc}]^{bent} = [n_{oc}]^{straight} - n_{oc}(R_{oc}/R_{corr}) \quad (8)$$

In a preferred embodiment, the equivalent index at radius just above $R_{oc}$ is between the effective indices of the fundamental core mode and pedestal mode in the bent fiber segment. For the purpose of this discussion, the outer cladding is understood to be the region just outside the trench region and is not necessarily the outermost region of the fiber cross-section. There are, of course, typically other regions outside of the outer cladding region with very different indices, which may include a pump-confining (double-clad) region, over-clad region, polymer coating, or an air region outside of the fiber.

Adherence to these design principles assures that in the core region 52, for example, fundamental mode 16 is effectively propagated, whereas HOM 18 is effectively suppressed. The degree to which the HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, mitigating one or more of the following impairments: poor beam quality (or $M^2$), gain competition, high total insertion loss, noise in the signal mode, and microbend loss.

When my fiber is properly designed to effect index matching (or resonance) between unwanted HOM core modes and particular pedestal modes, then the slope of core mode and pedestal mode index curves is nearly the same, especially in the region where they intersect. Consequently, index-matched coupling between the core and pedestal modes is achieved over a relatively wide wavelength range.

The foregoing principles of resonant coupling (index matching) may also be applied to the suppression of multiple unwanted core modes either by resonantly coupling them to a single, mode of a pedestal region or by resonantly coupling them to different modes of one or more pedestal regions, each core mode being resonant with a separate pedestal mode.

Simulation Results

The following discussion describes computer simulations of various optical fiber designs incorporating the inventive principles of my invention for HOM suppression in bent fibers. Although silica fibers are assumed for purposes of the simulations, the particular materials, dimensions and operating conditions are provided by way of illustration only and, unless otherwise expressly stated, are not intended to limit the scope of the invention.

Each of six simulated fibers (identified hereinafter as Fibers 1-6) had essentially the design depicted in FIG. 5 with the same core region diameter ($D_{core}$=34 μm) and contrast ($\Delta n = n_{core} - n_{tr} = 0.0015$) but with different cladding structures, which are specified in the table below. Fibers 1-3 were designed for straight-fiber HOM suppression and Fibers 4-6 were obtained from Fibers 1-3 by using the bent-fiber-compensation techniques described above.

| Fiber | 1 | 2 | 3 | 4 | 5 | 6 |
|---|---|---|---|---|---|---|
| $R_{ped}$ | 28.5 | 30 | 31.5 | 28.5 | 30 | 31.5 |
| $R_{oc}$ | 40 | 43 | 46 | 40 | 43 | 46 |
| $D_{ped}$ | 20.7 | 19.6 | 19.4 | 20.7 | 19.6 | 19.4 |
| $n_{core} - n_{ped}$ | 0 | 0 | 0 | 0.0003 | 0.0003 | 0.0003 |
| $n_{core} - n_{oc}$ | 0.0002 | 0.0002 | 0.0002 | 0.0006 | 0.0006 | 0.0006 |

FIG. 6A shows the material and equivalent index profiles 6.1 and 6.2, respectively, of Fiber 5. The equivalent index profile reflects that the (corrected) fiber bend radius was $R_{corr}$=14.0 cm. Fibers 4 and 6 had similar profiles. Fibers with $R_{corr}$=16.0 cm were also evaluated.

First, I designed Fibers 1-3 for index matching neglecting bend effects to provide a baseline for comparison, and then I designed other fibers (e.g., Fibers 4-6) in which two index parameters were shifted to correct for the effects of bending; namely, the index of the pedestal regions 58.N according to Equation (5) and the index of the outer cladding region 54. In the pre-compensated designs the distance between the center of the core region and the center of the pedestal regions ($R_{ped}$) was chosen to provide the desired resonant coupling between HOM 16 of the core region and the fundamental mode 20 of the pedestal region (FIG. 4), thus providing sufficient loss to HOM 18 while at the same time limiting loss of fundamental mode 16. Similarly, the outer cladding radius $R_{oc}$ and index $n_{oc}$ were chosen to provide large HOM loss and to reduce (e.g., minimize) loss of fundamental mode 16.

Figure 7:
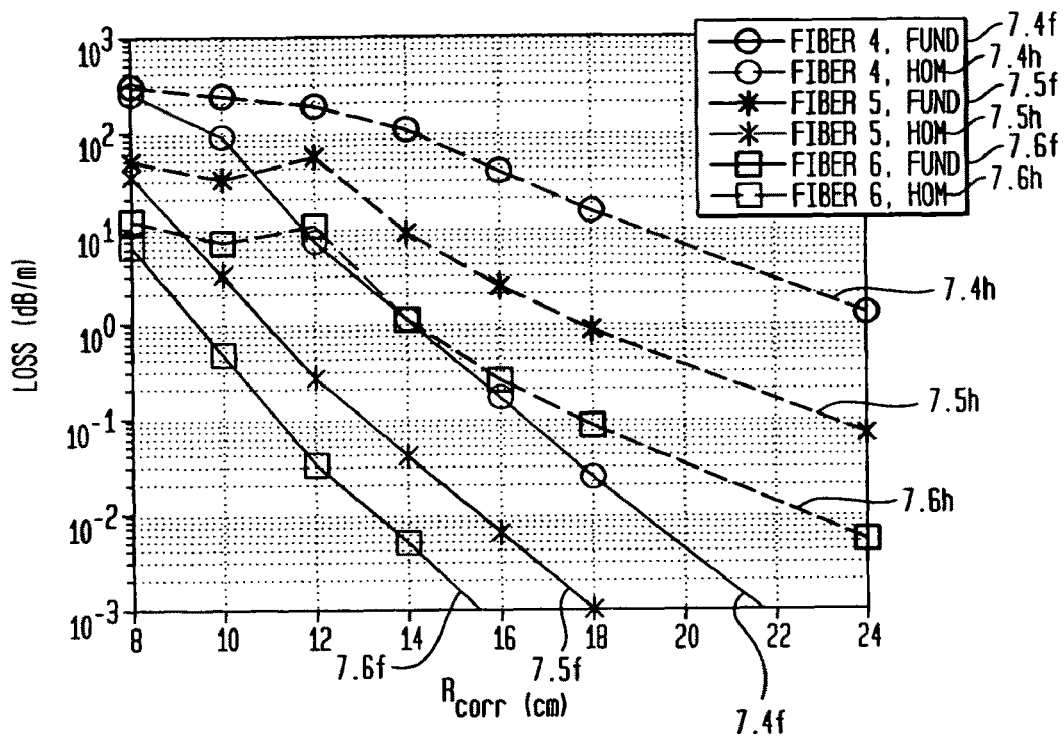
FIG. 7 is a graph showing mode loss versus corrected bend radius for three different fibers of the type shown in FIG. 5.
Figure 8:
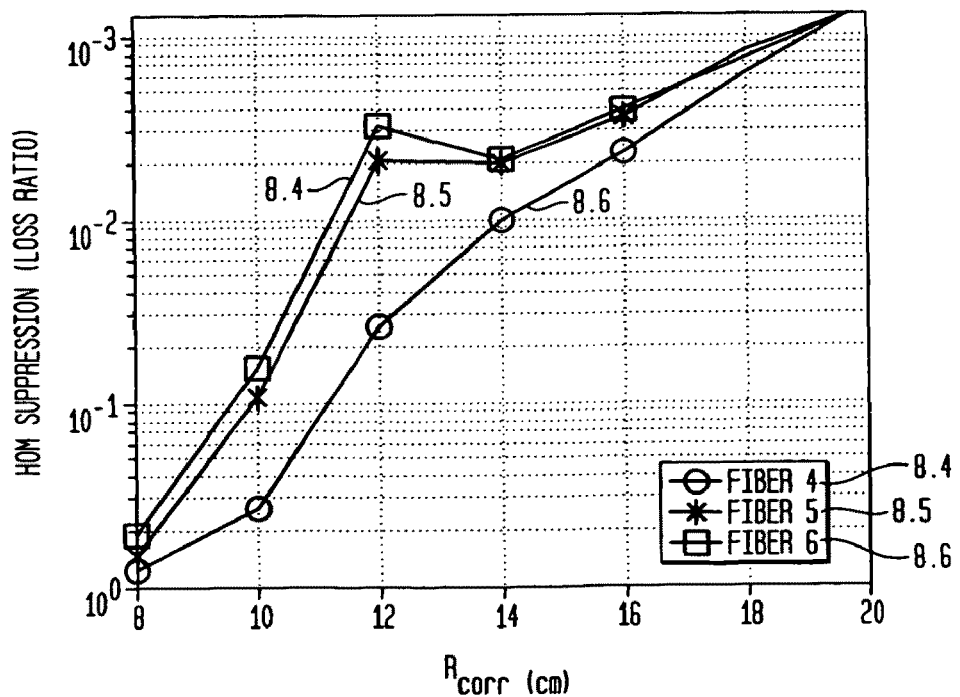
FIG. 8 is a graph showing HOM suppression (loss ratio) versus corrected bend radius for the same three fibers described in FIG. 7.

The pre-compensated designs (Fibers 4-6) were a vast improvement over the uncompensated designs (Fibers 1-3), easily achieving large HOM loss (FIG. 7) and large ratios of ratios of HOM-to-fundamental-mode loss (FIG. 8). More specifically, losses for the fundamental mode 16 and HOM 18 for the three pre-compensated designs are shown in FIG. 7. As desired, near a design bend radius of $R_{corr}$=15 cm, fundamental mode losses (curves 7.4f, 7.5f, 7.6f) were small enough to give acceptable total bend loss in a typical amplifier (gain-producing fiber of length ~1-10 m, for example). At the same time, HOM loss (curves 7.4h, 7.5h, 7.6h) were high enough to give many dB of suppression over the amplifier length. Looked at another way, the ratio of HOM-to-fundamental-mode loss (FIG. 8) was very high, ranging from 10 to 1000 approximately for all three pre-compensated fibers depending on $R_{corr}$. For example, for a coiled fiber with $R_{corr}$=14 cm, Fiber 4 had a fundamental mode bend-induced loss of 1 dB/m and HOM loss exceeding 100 dB/m. The different results for Fibers 4, 5, and 6 also indicate an ability to tailor the design to specific requirements (for example, adjusting the absolute levels of fundamental mode and HOM loss while maintaining large suppression) by adjusting design parameters. For example, Fiber 4 might be suitable for a relatively short amplifier length [~1 m gain-producing fiber coiled to $R_{corr}$~14 cm, giving total loss ~1 dB] but would not be suitable for a substantially longer amplifier at tighter bends, since the fundamental mode loss may be unacceptable. For a longer amplifier length [e.g., 10 m gain-producing fiber length coiled to $R_{corr}$~14 cm], one might prefer Fiber 6, which has less than 0.5 dB of total bend loss while still providing 100 dB of HOM suppression over the 10 m fiber length. The general design strategy can be adjusted to accommodate fiber length, coil size, requirements on HOM and fundamental mode loss, as specified or needed to improve performance of the larger system.

Figure 9:
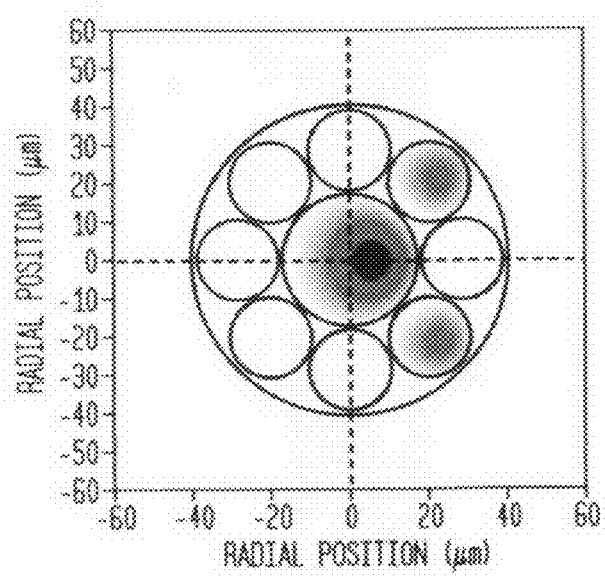
FIG. 9 is an intensity plot of a bent fiber ($R_{bend}$=14.0 cm) of the type shown in FIG. 5 that is not pre-compensated, contrary to my invention. When bent, the fundamental mode of the core region is disadvantageously coupled into two of the pedestal regions (waveguides)

Mode intensity plots (FIGS. 9-11) are illustrative of the index-matched coupling and the correction needed to compensate for the effects of bending. A fiber designed without considering the bend correction (Fiber 1; FIG. 9) actually showed substantial coupling of the fundamental mode to the pedestal regions 58.1 and 58.3 at $R_{corr}$=14 cm. FIG. 9 illustrates the problem schematically depicted in FIG. 2. Undesirable coupling of the fundamental core mode 16 to the pedestal mode 20 is a direct consequence of bending. In fact; the same fiber design achieved excellent selective coupling of HOMs and no significant coupling to the fundamental mode for a straight fiber ($R_{bend}$=infinity). The good straight-fiber performance was enabled by a well-designed geometry with outer cladding index close to (but slightly lower than) the core index ($n_{core}$−$n_{oc}$=0.0002, in this example).

Figure 10:
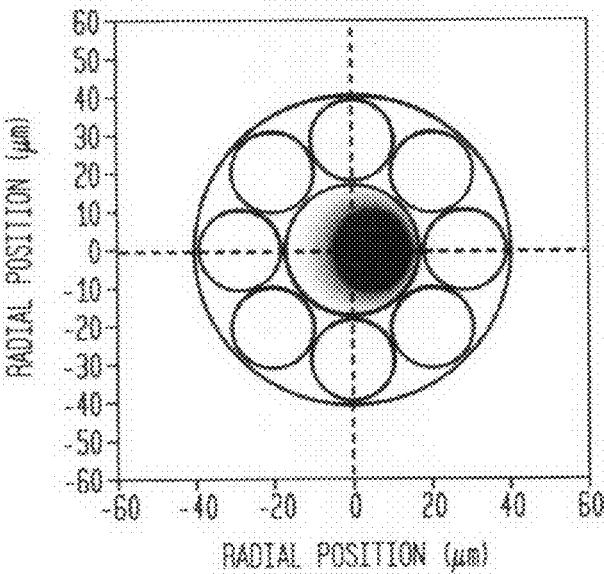
FIG. 10 is an intensity plot of a fiber of the type shown in FIG. 5 that is pre-compensated in accordance with one embodiment of my invention. When bent, the fundamental mode of the core region advantageously does not couple into the pedestal regions (waveguides)
Figure 11:
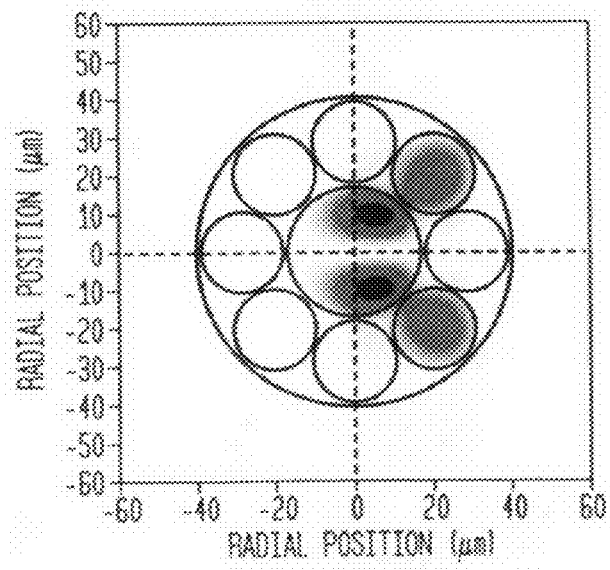
FIG. 11 is an intensity plot of a fiber of the type shown in FIG. 5 that is pre-compensated in accordance with one embodiment of my invention. When bent, HOMs of the core region advantageously couple into two of the pedestal regions (waveguides)

On the other hand, a fiber pre-compensated for the effects of bending had no significant coupling of the fundamental mode 16 to the pedestal regions, as shown in FIG. 10 (Fiber 4), but it had large coupling of the HOM 18 as shown in FIG. 11 (Fiber 4). Thus, Fiber 4 (as well as Fibers 5 and 6) exhibited the desired selective suppression of unwanted HOMs.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In particular, in the calculations above the fiber was assumed to have no significant spin or twist that would cause the pedestal regions to axially wrap around the core region. Alternatively, however, spin or twist could be utilized to produce helical waveguide cladding features to leverage additional benefits, such as intrinsic bent path of the pedestal regions to help shed HOM light, and selective mode coupling according to azimuthal variation of the modes. Twisted or spun fiber could also be used to ensure that all bend orientations are sampled over a characteristic length of fiber. Note that in some such designs the local orientation and bend radius between core and pedestal regions should be taken into account.

In addition, the simulations above used a step-index fiber (SIF) profile for both the core region and pedestal region because this design provides a direct comparison with traditional step-index fibers, which are still important in the industry. One skilled in the art can, however, readily apply my bend-compensation concepts for resonant suppression of unwanted modes to non-step-index core profiles, or to fibers including air holes, inclusions, etc. In particular, a graded-index (e.g., parabolic) core shape, which may be advantageous for the reasons discussed in parent application Ser. No. 11/319,121 (Fini 2), may also benefit from the additional HOM suppression provided by this invention.

More specifically, in parent application Ser. No. 11/319, 121 (Fini 2), which has been published as US Patent Application Publication 2007/0147751 on Jun. 27, 2007 and is incorporated herein by reference, I have proposed a distortion resistant fiber design with, for example, parabolically-graded and linearly-graded (cone-shaped) index cores. These designs demonstrated improvements over step-index designs in terms of simulated area, loss, and mode-coupling indicators. These bend-resistant designs lead to favorable amplifier performance metrics (gain interaction, bend loss, HOM suppression, and effective mode area) provided that design parameters (core size, total core contrast, grading depth, index profile shape and gain-dopant profile) are properly configured. By the terms bend-resistant fiber or distortion-resistant fiber, I refer to the degree to which the performance of a fiber is not adversely affected when the fiber is bent. That performance is measured principally by the following fiber performance characteristics: bend loss, bend distortion, HOM suppression, and gain interaction.

The approach to designing a distortion resistant LMA fiber, as described in the above parent application, is that light propagating in the bent segments of a fiber is primarily directly impacted by the equivalent index profile, not the material index profile. Light sees the latter in the much shorter straight segments of a typical packaged fiber. Therefore, the correct design 6 approach is to optimize mode properties of the equivalent index profile, not of the material index profile (that is, to not ignore any of the important bend-distortion impacts). If a bend-induced index gradient is unavoidable, it can be canceled, at least over part of the core, by an opposite material index gradient. With particular reference to FIGS. 4A, 9A and 9B of the parent application, because of this cancellation an appropriate graded-index profile 94 of the material index (FIG. 9A) results in an equivalent index profile 95 having a flat index peak 96 (FIG. 9B), in contrast to a SIF with equivalent index sharply peaked at the core edge (FIG. 4A, profile 45). A parabolic material index profile 94 is a particularly attractive special case because it has an equivalent index shape (curvature) at its peak that is largely bend invariant for typical bend radii.

Applications

Figure 12:
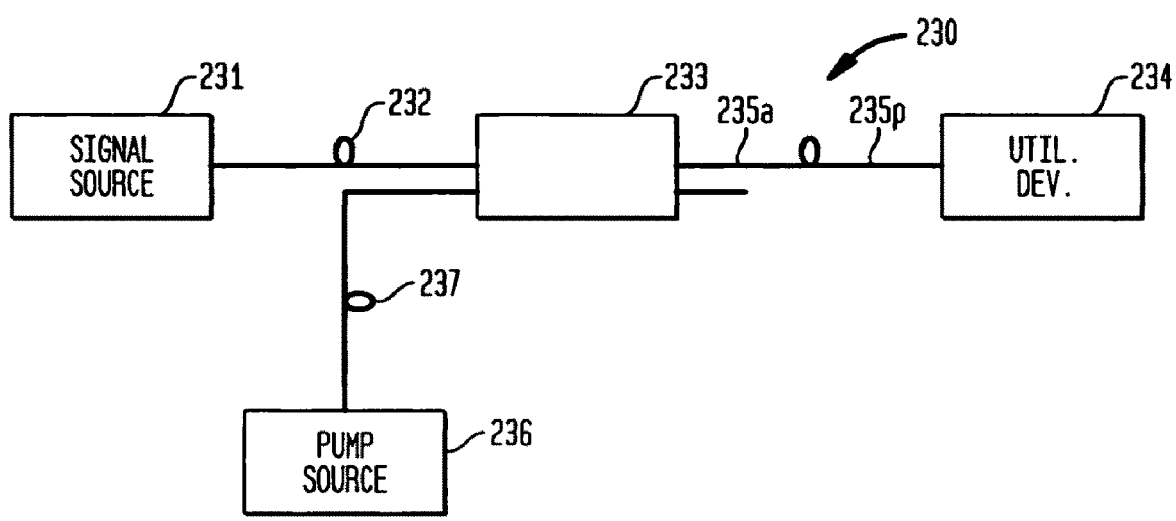
FIG. 12 is a block diagram of an optical amplifier in accordance with one application of LMA optical fibers in accordance with my invention.

A principal application of my invention is depicted in FIG. 12, an optical fiber amplifier 230 comprising a LMA gain-producing optical fiber (GPF) 235a optically coupled to an optional LMA pigtail fiber 235p. GPF 235a is optically coupled to a coupling device 233, and pigtail fiber 235p is optically coupled to a utilization device 234. Either GPF 235a or pigtail 235p, or both, is designed in accordance with my invention; that is, inside the amplifier package either or both of these fibers would typically be coiled.

In telecommunication applications device 233 is known as a wavelength division multiplexer; in high power non-telecommunications applications it is known as a pump-combiner. For simplicity, hereinafter I will describe this aspect of my invention in the context of high power non-telecommunications applications. In this case, the pump-combiner 233 couples the outputs of an optical input signal source 231 and an optical pump source 236 into the GPF 235a. The input signal source 231 generates a first-wavelength optical input signal, which is coupled to an input of a pump combiner 233 via a conventional fiber 232, whereas the pump source 236 generates a second-wavelength optical pump signal, which is coupled by a conventional fiber 237 to another input of pump combiner 233.

As is well known in the art, the pump signal generates a population inversion in the GPF 235a, which amplifies the input signal from input source 231. The amplified input signal propagates along GPF 235a (and through pigtail 235p, if present) to utilization device 234. In high power applications the latter may include a myriad of well known devices or apparatuses; e.g., another optical amplifier, a beam collimator, a lens system, a work piece (e.g., for cutting or welding); whereas in telecommunications applications, utilization device 234 may include an optical receiver, an optical modulator, an optical coupler or splitter, or a piece of terminal equipment.

Illustratively, the input source 231 is a laser that generates a relatively low power optical input signal at a wavelength in the amplification range of the GPF 235a, whereas the pump source 236 is a semiconductor light emitting diode (LED) or an array of LEDs that generates a relatively high optical power (e.g., above about 150 mW) pump signal at a shorter wavelength that produces the desired amplification of the input signal. Illustratively, the GPF 235a is rare-earth-doped fiber (e.g., preferably a ytterbium-doped fiber) or a chromium-doped fiber. In the preferred ytterbium fiber case, the signal source 231 generates an input signal having a wavelength of about 1080 nm, and the pump source 236 generates a pump signal at a wavelength of about 915 nm, or alternatively at about 975 nm. It is noted here that a semiconductor laser may also be used as a pump source, but an LED, especially an array of LEDs, is preferred because more total light can be coupled into the fiber with an LED.

Although the amplifier 230 of FIG. 12 depicts a common co-propagating pump configuration (i.e., the pump and input signals propagate in the same direction through the GPF), it is also possible to use a counter-propagating configuration (i.e., the pump and input signals propagate in opposite directions through the GPF). In addition, a multiplicity of amplifiers may be arranged in tandem, a scheme that is well known in the art for increasing the total gain of a high power multi-stage system. Pump energy may also be transversely coupled into the amplifier.

In addition, when provided with a suitable, well-known optical resonator (e.g., a pair of spaced apart fiber gratings) the GPF may function as a laser.

Other applications of my invention can be found in, for example, telecommunication systems in which a fiber cable (e.g., a curl cable) is bent to a radius known a priori.

I claim:

1. An optical fiber having at least a segment that is bent, said bent segment comprising:
    a core region having a longitudinal axis, and
    a cladding region surrounding said core region, said core and cladding regions configured to support and guide the propagation of signal light in a fundamental transverse mode and at least one higher-order transverse mode, said modes propagating in said core region in essentially the direction of said axis, said cladding region comprising:
    an outer cladding region,
    an annular trench region disposed between said core region and said outer cladding region,
    at least one axially-extending pedestal region disposed within said trench region being configured (i) to support the propagation of at least one transverse mode of said at least one pedestal region, and (ii) to resonantly couple the at least one higher order transverse mode of said core region to the at least one transverse mode of said at least one pedestal region, wherein said resonant coupling is precompensated for effects from said bending; and wherein the refractive index $n_{ped}$ of said at least one axially-extending pedestal region is selected to pre-compensate for an expected bend-induced shift in the equivalent index of said pedestal region wherein said shift is equivalent to $0.8n_{ped}(R_{ped}/R_{bend})$, where $R_{ped}$ is the distance of the center of said pedestal region from said axis and $R_{bend}$ is the radius of said bent segment.

2. The fiber of claim 1, wherein said at least one pedestal region is also configured to not resonantly couple said fundamental mode of said core region to any transverse mode of said pedestal region.

3. The fiber of claim 1, wherein the refractive index of said outer cladding region is sufficiently high to allow said coupled transverse mode to escape into said outer cladding region.

4. The fiber of claim 1, further comprising a plurality of said pedestal regions disposed within said trench region.

5. The fiber of claim 4, wherein said pedestal regions are disposed at a same radius within said trench region.

6. The fiber of claim 5, wherein said pedestal regions are essentially equally spaced azimuthally within said trench region.

7. The fiber of claim 6, wherein said pedestal regions are radially centered within said trench region.

8. The fiber of claim 1, wherein said fiber is a large-mode-area fiber.

9. The fiber of claim 1, wherein the refractive index of said outer cladding region is greater than that of said trench region.

10. The fiber of claim 1, wherein the refractive index of said outer cladding region is similar to that of said trench region, wherein the fiber further comprises lossy means disposed within said pedestal region for suppressing modes coupled therein from said core region.

11. An optical amplifier comprising:
    a large-mode area, gain-producing optical fiber for amplifying signal light in response to optical pump energy applied thereto,
    said gain-producing fiber comprising a fiber according to claim 1,
    a source of said pump energy, and
    a coupler for coupling said pump energy and said signal light into said gain-producing fiber.

12. An optical amplifier comprising:
    a large-mode area, gain-producing optical fiber for amplifying signal light in response to optical pump energy applied thereto,
    a pigtail fiber coupled to said gain-producing fiber,
    at least one of said fibers comprising a fiber according to claim 1,
    a source of said pump energy, and
    a coupler for coupling said pump energy and said signal light into said gain-producing fiber.

13. A large-mode area optical fiber having at least a segment that is bent, said bent segment comprising:
    a core region having a longitudinal axis, and
    a cladding region surrounding said core region, said core and cladding regions configured to support and guide the propagation of signal light in a fundamental transverse mode and at least one higher-order transverse mode, said modes propagating in said core region in essentially the direction of said axis, said cladding region comprising:
    an outer cladding region,
    an annular trench region disposed between said core region and said outer cladding region, said trench region having a refractive index lower than that of said outer cladding region, and
    a plurality of axially-extending pedestal regions disposed circumferentially within said trench region, each of said pedestal regions being configured (i) to support the propagation of at least one transverse mode of said pedestal region, (ii) to resonantly couple at least one of said higher order transverse modes of said core region to at least one transverse mode of said pedestal region, both when said fiber is bent, wherein said resonant coupling is precompensated for effects from said bending and (iii) to not resonantly couple said fundamental mode of said core region to any transverse mode of said pedestal region, wherein the refractive index $n_{ped}$ of each of said pedestal regions is selected to pre-compensate for an expected bend-induced shift in the equivalent index of each of said pedestal regions wherein said shift is equivalent to $0.8n_{ped}(R_{ped}/R_{bend})$, where $R_{ped}$ is the distance of the center of each of said pedestal region from said axis and $R_{bend}$ is the radius of said bent segment.

14. The fiber of claim 13, wherein each of said pedestal regions are essentially equally spaced azimuthally and at the same radius within said trench region.

15. An optical fiber comprising:
a first segment that is bent and a second segment that is straight, each of said segments comprising:
a core region having a longitudinal axis, and
a cladding region surrounding said core region, said core and cladding regions configured to support and guide the propagation of signal light in a fundamental transverse mode and at least one higher-order transverse mode, said modes propagating in said core region in essentially the direction of said axis, said cladding region comprising:
an outer cladding region,
an annular trench region disposed between said core region and said outer cladding region,
at least one axially-extending pedestal region disposed within said trench region, said at least one pedestal region having a refractive index higher than that of said outer cladding region, said pedestal region being configured (i) to support the propagation of at least one transverse mode and (ii) to resonantly couple at least one selected mode of said higher order transverse modes of said core region to at least one transverse mode of said pedestal region wherein said resonant coupling is precompensated for effects from said bending, but (iii) not to resonantly couple said fundamental mode of said core region to any transverse mode of said pedestal region, within said bent segment; and
said pedestal region being configured (i) to support the propagation of at least one transverse mode and (ii) not to resonantly couple said selected mode of the core region to any transverse mode of said pedestal region, within said straight segment, wherein the refractive index $n_{ped}$ of said at least one axially-extending pedestal region is selected to pre-compensate for an expected bend-induced shift in the equivalent index of said pedestal region wherein said shift is equivalent to $0.8n_{ped}(R_{ped}/R_{bend})$, where $R_{ped}$ is the distance of the center of said pedestal region from said axis and $R_{bend}$ is the radius of said bent segment.

16. The fiber of claim 1, wherein the at least one higher-order transverse mode of the core region has an effective index that is substantially the same as an effective index of the at least one transverse mode said pedestal region, in said bent segment.

* * * * *